April 14, 1959 P. J. PACKMAN ET AL 2,881,900
METHOD OF, AND APPARATUS FOR, HANDLING FLAT ARTICLES
Filed July 26, 1955 6 Sheets-Sheet 2

Inventors: Percival James Packman
David Charles Morton
by: Michael S. Striker

Inventors:
Percival James Packman
David Charles Morton by: Michael S. Striker agt April 14, 1959    P. J. PACKMAN ET AL    2,881,900
METHOD OF, AND APPARATUS FOR, HANDLING FLAT ARTICLES
Filed July 26, 1955    6 Sheets-Sheet 4

Inventors:
Percival James Packman
David Charles Morton
by: Michael S. Striker

April 14, 1959     P. J. PACKMAN ET AL     2,881,900
METHOD OF, AND APPARATUS FOR, HANDLING FLAT ARTICLES
Filed July 26, 1955                                        6 Sheets-Sheet 6
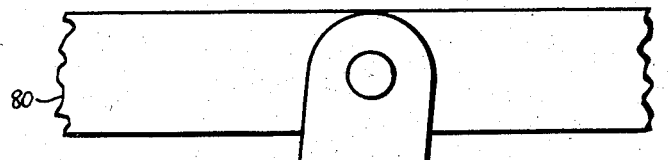
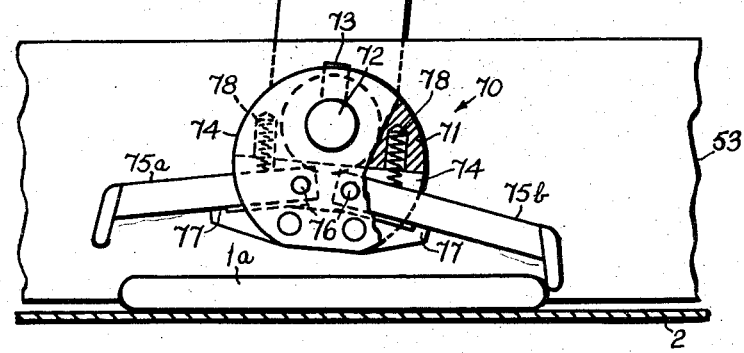
FIG.22
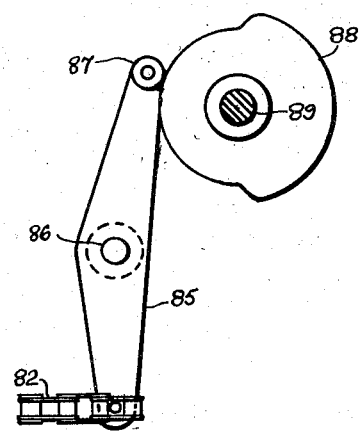
FIG.23
FIG.24
Inventors:
Percival James Packman
David Charles Morton
by: Michael S. Striker
att.

United States Patent Office 2,881,900
Patented Apr. 14, 1959

2,881,900

METHOD OF AND APPARATUS FOR HANDLING FLAT ARTICLES

Percival James Packman and David Charles Morton, Twyford, England, assignors to Huntley & Palmers Limited, Reading, England, a British company Application July 26, 1955, Serial No. 524,370

Claims priority, application Great Britain July 29, 1954

6 Claims. (Cl. 198—35)

The present invention relates to apparatus for handling flat articles, such as biscuits.

It is customary to mass-produce biscuits on a travelling conveyor band upon which the biscuits receive various treatments and are finally presented for inspection in rows on the conveyor band before passing to a packaging stage. In large quantity production the conveyor bands occupy a considerable area and it is a difficult problem to direct the biscuits to a packaging machine when they are spread out over such a large area.

The present invention has for its object to provide apparatus for handling flat articles, such as biscuits, which facilitates further handling operations on the articles, for example packaging and sandwiching and enrobing operations on biscuits.

According to the present invention such an apparatus comprises, in essence, conveyor means forming a substantially flat conveyor surface for conveying thereon a plurality of rows of articles to be stacked which rows extend in the direction in which they are being conveyed, and means operatively associated with the conveyor means for stacking the articles in a single multiple-layer row.

The layered row of articles may be formed on the said plane conveying surface or on an auxiliary conveyor moving along side the plane conveying surface.

The articles may be allowed to adopt an irregular vertical arrangement in the layered row or, alternatively, provision may be made to ensure that the layered row consists of a number of stacks of superposed articles.

Figure 1:
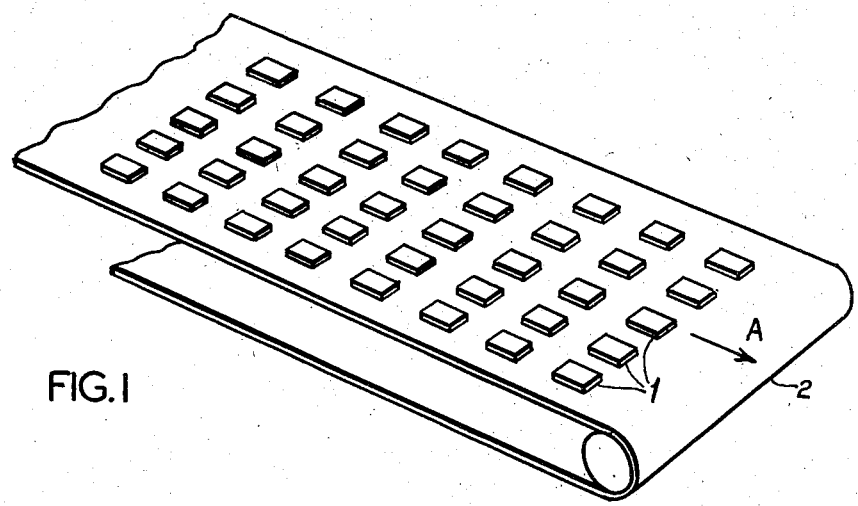
Figure 2:
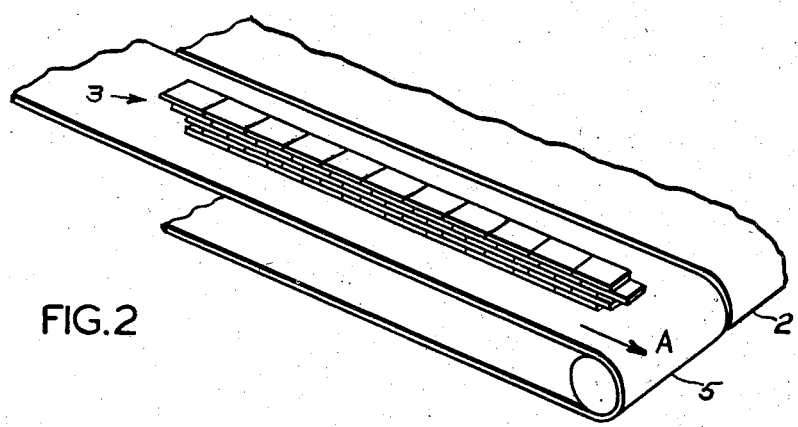
Figure 3:
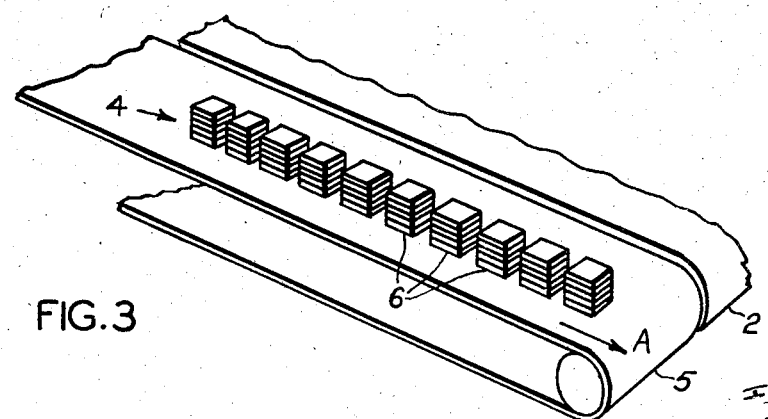
Figure 4:
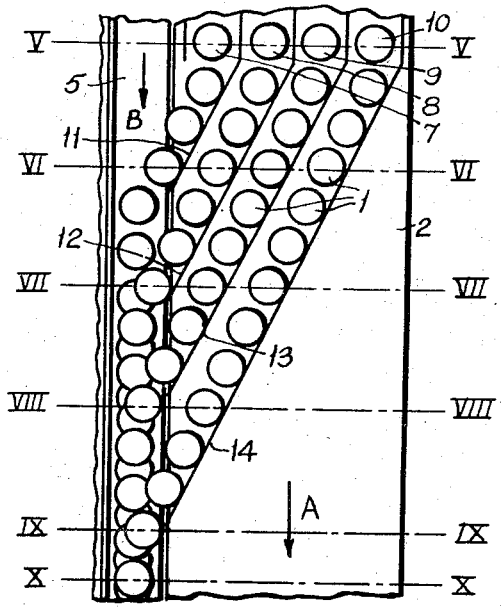
Figure 5:
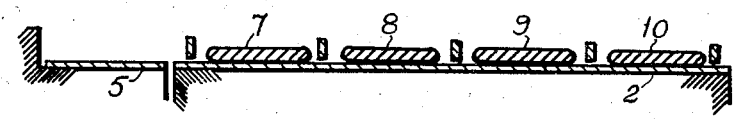
Figure 11:
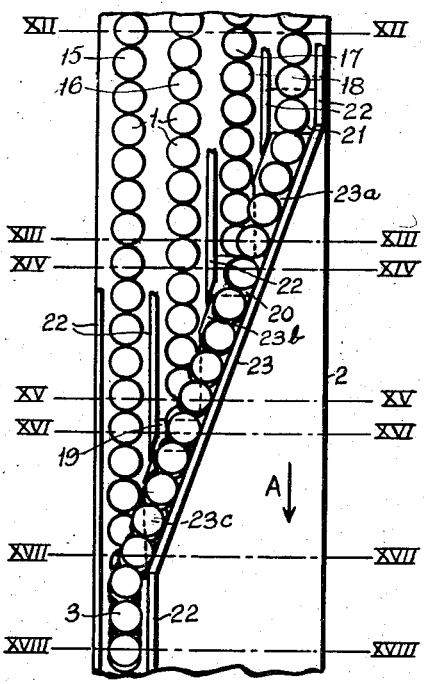
Figure 12:
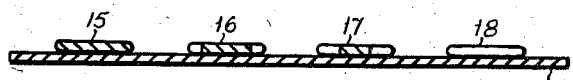
Figure 13:
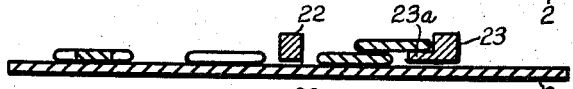
Figure 14:
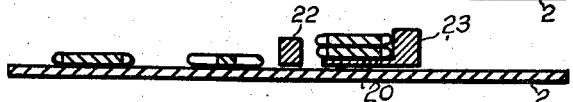
Figure 15:
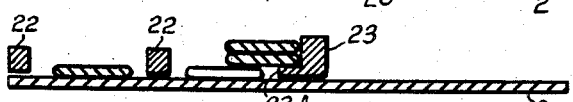
Figure 16:
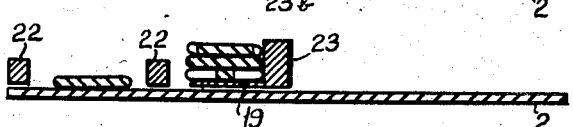
Figure 17:
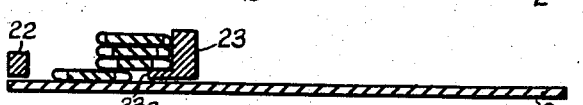
Figure 18:
Figure 19:
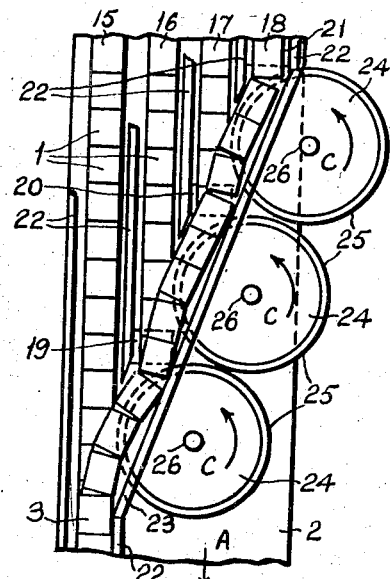
Figure 20:
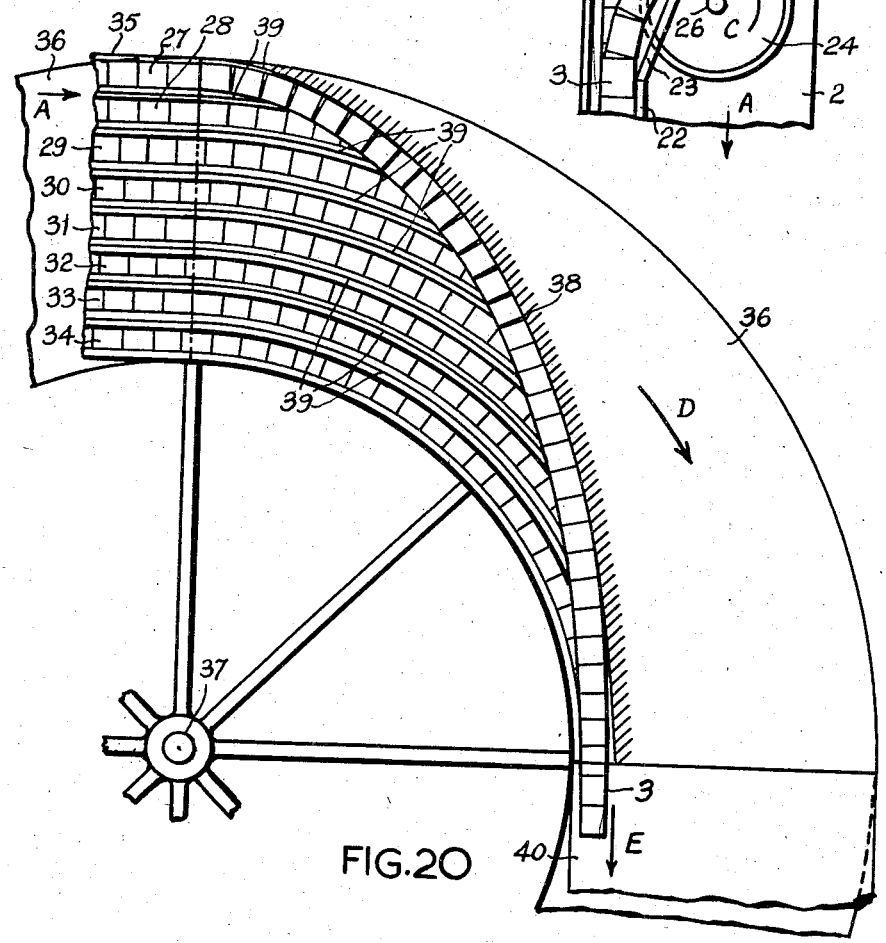
Figure 21:
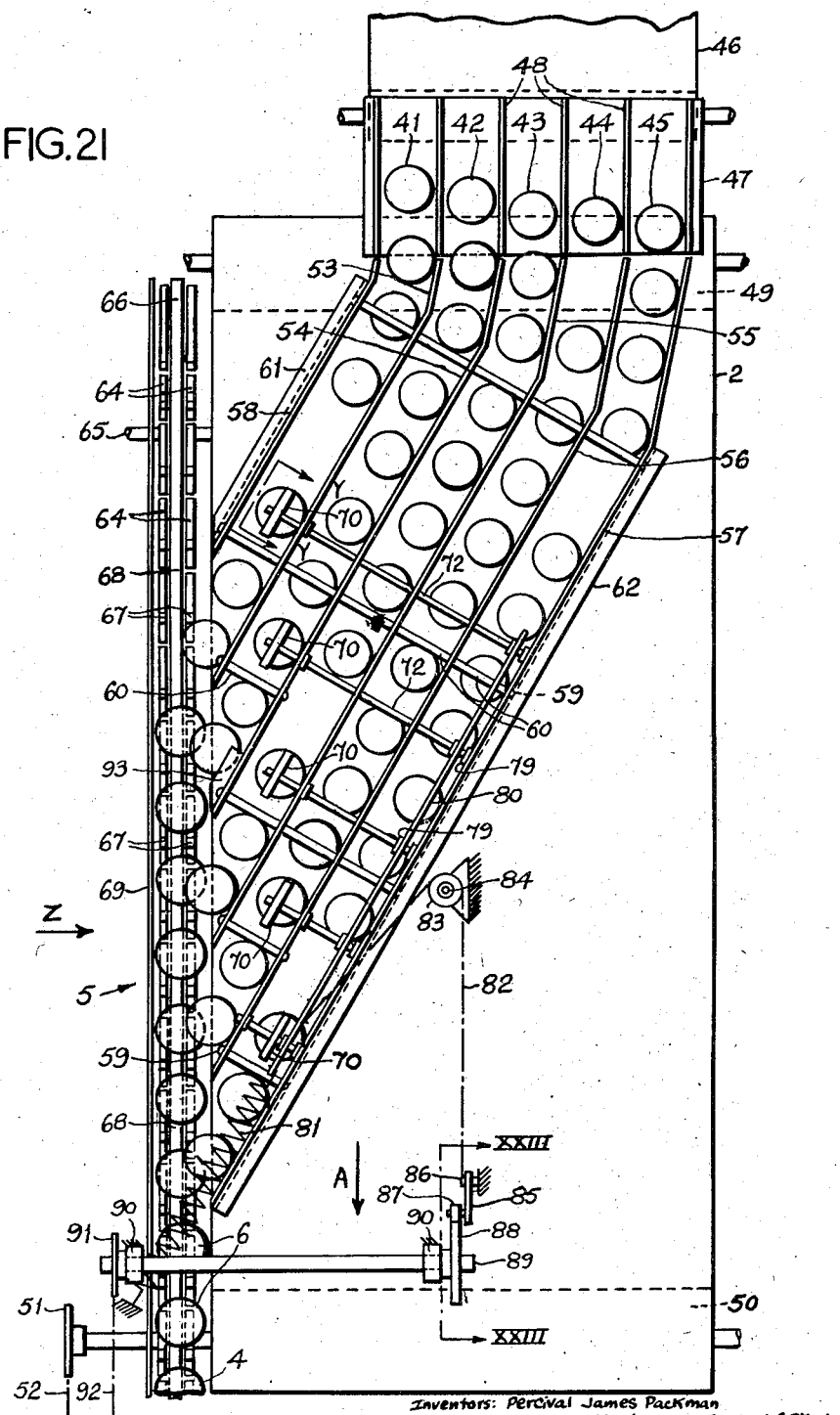

The invention will now be further described, by way of example, with reference to the accompanying drawings, in which Figures 1 to 3 are schematic perspective views of parts of horizontal conveying surfaces with a number of biscuits resting thereupon, Figure 4 is a schematic plan of one form of apparatus for handling biscuits in accordance with the invention, Figures 5 to 10 are schematic sectional elevations, on an enlarged scale, along the lines V—V, VI—VI, VII—VII, VIII—VIII, IX—IX, and X—X, respectively, of Figure 4, Figure 11 is a schematic plan of a second form of apparatus for handling biscuits in accordance with the invention, Figures 12 to 18 are schematic sectional elevations, on an enlarged scale, along the lines XII—XII, XIII—XIII, XIV—XIV, XV—XV, XVI—XVI, XVII—XVII, and XVIII—XVIII, respectively, of Figure 11, Figure 19 is a schematic plan of a modified form of the apparatus according to Figure 11, Figure 20 is a schematic plan of a further modified form of the apparatus according to Figure 11, Figure 21 is a diagrammatic plan of a biscuit handling machine for producing a layered row of biscuits of the kind illustrated in Figure 3, Figure 22 is a view, on an enlarged scale, in the direction of the arrows Y of Figure 21, Figure 23 is a section, on an enlarged scale, along the line XXIII—XXIII of Figure 21, and Figure 24 is a side elevation of a part of Figure 21 in the direction of the arrow Z.

Referring to the drawings, Figure 1 shows a number of biscuits 1 lying on a horizontal conveying surface 2 travelling in the direction of the arrow A, the biscuits being arranged in a number of rows parallel to the direction of travel of the conveying surface. It is the object of the apparatus according to the present invention to rearrange the biscuits 1 so that they lie in one or more layered rows, such as the row 3 of Figure 2 or the row 4 of Figure 3. The layered row or rows may be formed on the conveying surface 2 or on an auxiliary conveying surface 5, as will be explained more fully hereinafter. In Figure 2 the biscuits in the row 3 are arranged irregularly in the vertical direction whereas in Figure 3 the biscuits in the row 4 are arranged in a plurality of orderly vertical stacks 6.

Referring now to Figures 4 to 10, an auxiliary flat conveying surface 5 is arranged adjacent to one edge of the main conveying surface 2 on which the biscuits 1 are arranged in a plurality of rows arranged substantially parallel to the direction of travel of the main conveying surface indicated by the arrow A. In Figure 4 the biscuits are shown arranged in four rows 7, 8, 9 and 10, but it will be appreciated that the number of rows may be less than or greater than four. The direction of travel of the auxiliary conveying surface 5, indicated by the arrow B, is the same as that of the main conveying surface 2, but the former is downwardly inclined a few degrees, relative to the surface 2, in the direction of travel of the latter. The auxiliary conveying surface 5 is driven by any suitable means at approximately the same speed as the surface 2.

A deflector means is arranged above the main conveying surface 2 in the path of the rows of biscuits, the object of this deflector means being to deflect the rows of biscuits from the surface 2 on to the auxiliary conveying surface 5. To this end the deflector means comprises four deflector plates 11, 12, 13 and 14, each of which plates is arranged to deflect a different row of biscuits on the main conveying surface 2.

Figure 6:
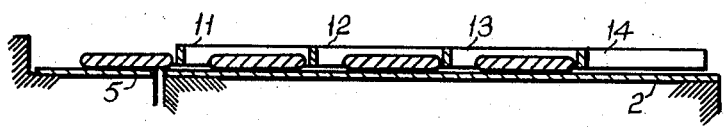

The deflector plate 11, which deflects the row 7 lying closest to the surface 5, is arranged to deflect the biscuits of row 7 to a point at the edge of the surface 2 which is at the same level as, or slightly above, the adjacent edge of the surface 5 (see Figure 6). As the biscuits of the row 7 are moved by the surface 2 along the deflector plate 11, the latter moves the biscuits sideways and transfers them on to the surface 5. This row of biscuits transferred on to the auxiliary conveying surface 5 then travels at the side of the main conveying surface 2 and gradually descends relative to the latter owing to the above mentioned relative inclination of the two conveying surfaces.

Figure 7:
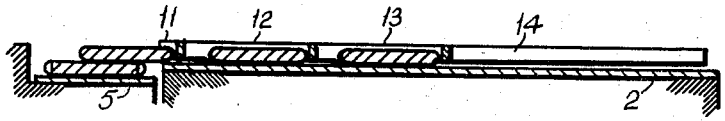

The row 8 on the main conveying surface 2 is deflected by the deflector plate 12 to a point at the edge of the surface 2 where the latter is higher than the surface 5 by an amount equal to, or slightly greater than, the thickness of the biscuits being handled (see Figure 7). Consequently the deflector plate 12 moves the biscuits of the row 8 from the surface 2 on to the top of the biscuits which were originally arranged in row 7 and which are now travelling on the surface 5. As a result a row of biscuits consisting of two superimposed layers of biscuits is formed on the auxiliary conveying surface 5, and this row travels at the side of the main conveying surface 2 and gradually descends relative to the latter.

Figure 8:
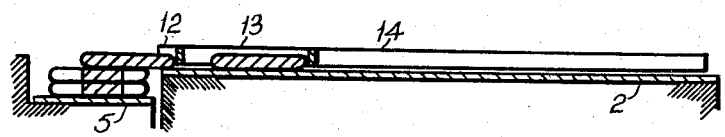

The row 9 on the main conveying surface 2 is deflected by the deflector plate 13 to a point at the edge of the surface 2 where the latter is higher than the surface 5 by an amount equal to, or slightly greater than, the height of the two superimposed layers of biscuits on the surface 5 (see Figure 8). The deflector plate 13 moves the biscuits of the row 9 from the surface 2 on to the top of the biscuits travelling on the surface 5 resulting in the formation on the latter surface of a row of biscuits consisting of three superimposed layers of biscuits.

Figure 9:
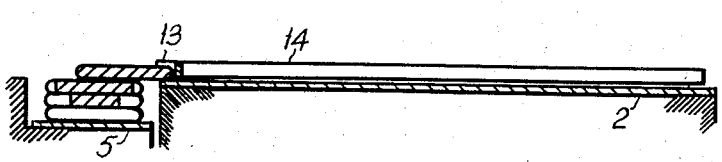
Figure 10:
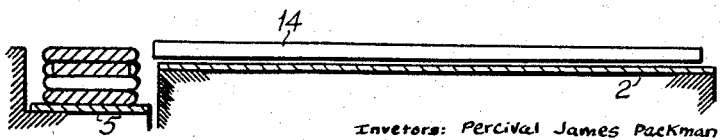

The row 10 on the main conveying surface 2 is deflected by the deflector plate 14 to a point at the edge of the surface 2 where the latter is higher than the surface 5 by an amount equal to, or slightly greater than, the height of the three superimposed layers of biscuits on the surface 5 (see Figure 9). The deflector plate 14 moves the biscuits of the row 10 from the main conveying surface 2 on to the top of the biscuits travelling on the auxiliary conveying surface 5 resulting in the formation on the latter surface of a row of biscuits consisting of four superimposed layers of biscuits.

The biscuits in the layered row formed on the auxiliary conveying surface 5 will normally be arranged irregularly in the vertical direction similarly to the row 3 of Figure 2.

If there are more than four rows of biscuits on the main conveying surface, further deflector plates may be arranged to deflect the additional rows. These additional rows may be deflected on to the layered row on the auxiliary conveying surface 5 or they may be deflected onto a further auxiliary conveying surface (not shown) arranged adjacent to either side of the main conveying surface. If this further auxiliary conveying surface is arranged at the same side of the main conveying surface as the auxiliary conveying surface 5 it will, of course, be arranged before or after the surface 5 in the direction of travel of the latter.

It will of course be appreciated that the single auxiliary conveying surface, or the first auxiliary conveying surface at each side of the main conveying surface in the case of apparatus comprising a plurality of auxiliary conveying surfaces, may be employed to convey a row of biscuits prior to the occurrence of the deflecting process described above. In this case the first row of biscuits to deflected from the main conveying surface would be deflected on to the top of the row of biscuits already on the auxiliary conveying surface instead of directly on to the latter.

Figures 11 to 18 show a second form of apparatus for handling biscuits in accordance with the invention in which the parallel rows of biscuits 1 on the conveying surface 2 are formed into a single layered row 3 on the conveying surface itself.

In these figures the biscuits 1 are shown arranged in four rows 15, 16, 17 and 18 on the horizontal conveying surface 2, the latter travelling in the direction of the arrow A. Three short stationary inclined ramps 19, 20 and 21 are arranged in the path of travel of the rows 16, 17 and 18, respectively, between stationary guides 22. The height of the upper end of each of the ramps 19, 20 and 21 above the surface 2 is equal to, or slightly greater than, the thickness of the biscuits 1.

The biscuits of the row 18, upon meeting the inclined ramp 21, are pushed up the ramp by the following biscuits and are deflected sideways in their raised positions towards the row 17 along the ledge 23a of a stationary deflector 23. The latter is arranged to deflect the biscuits of the row 18 on to the top of the biscuits of the row 17 immediately before this row is pushed up the inclined ramp 20. The double layer of biscuits formed in this way is pushed up the ramp 20 by the biscuits in row 17 and is then deflected along the ledge 23b of the deflector 23 towards the row 16. The double layer of biscuits is moved on to the top of the biscuits of the third row 16 immediately before this row is pushed up the inclined ramp 19 with the result that a row of biscuits consisting of three superimposed layers of biscuits is moved up the ramp 19. This row of biscuits finally is deflected along the ledge 23c of the deflector 23 on to the top of the biscuits in the row 15. A single row 3, consisting of four superimposed layers of biscuits, then proceeds along the conveying surface 2. Several such series of inclined ramps and deflectors may be arranged across the width of the conveying surface so that more than one stacked row of biscuits is formed on the conveying surface.

In a modified form of the last-described apparatus the biscuits may be positively driven from the top of one inclined ramp to the point where they are delivered on to the top of the biscuits of the adjacent row. Thus Figure 19 shows an apparatus in which the biscuits are positively driven from the tops of the inclined ramps 19, 20 and 21 by flat discs 24. Each disc 24 has a bevelled edge 25 and is arranged to rotate in the direction of the arrow C about a vertical axis 26. As the biscuits travel up an inclined ramp they are pushed on to one of the rotating discs 24 and are moved by the disc to a point where they are discharged from the disc on to the top of the adjacent row of biscuits on the conveying surface 2.

Figure 20 shows a further modified form of the apparatus according to Figure 11 in which the layered row 3 of biscuits travels in a direction substantially at 90° to the direction of the original rows 27—34. In Figure 20 the biscuits are discharged in the direction of the arrow A, from a conveyor or chute designated by the numeral 35, on to a horizontal disc 36 which rotates about a vertical axis 37 in the direction of the arrow D. A curved stationary deflector 38 is arranged immediately above the upper surface of the disc 36 and the rows of biscuits are guided to this deflector by stationary curved guides 39. Inclined ramps (not shown) similar to the ramps 19—21 of Figure 11, are arranged in the path of the rows 27—33 between the guides 39 close to the deflector 38. The finally produced layered row 3 moves off the disc 36 on to a plate 40 in the direction of the arrow E.

In each of the forms of apparatus so far described the layered row of biscuits produced is of the kind illustrated in Figure 2 of the drawings, i.e. the biscuits are arranged irregularly in the vertical direction in the row. Figures 21 to 24 show a further form of apparatus for handling biscuits in accordance with the invention which results in the formation of a layered row of biscuits of the kind shown in Figure 3, i.e. a row in which the biscuits are arranged in a plurality of substantially vertical stacks.

Referring to Figures 21 to 24, the object of the apparatus illustrated is to rearrange five rows 41–45 of biscuits 1 on the main conveyor 2 into a single layered row 4 on the auxiliary conveyor 5 in which the biscuits are arranged in a plurality of substantially vertical stacks 6. The biscuits 1 are delivered to the conveyor 2 by a conveyor 46 over a plate 47 provided with guides 48. The conveyor 46 may be the band conveyor of a travelling oven through which the biscuits 1 have passed.

The conveyor 2 is an endless band conveyor mounted on rollers 49, 50, the roller 50 being driven from any suitable power source (not shown) by means of a sprocket wheel 51 and chain 52. The upper surface of the conveyor 2 travels in the direction of the arrow A, and it is upwardly inclined in the direction of the arrow A by a few degrees as best seen in Figure 24.

Five stationary deflector plates 53–57 are arranged above the conveyor 2 in the paths of the rows 41–45, respectively. These deflector plates, together with a plate 58, are securely clamped together in spaced parallel relationship by means of bolts 59 and spacing pieces 60. The entire deflector assembly is supported by angles 61 and 62 from the frame of the apparatus (not shown) with the lower edge of each of the plates 53—58 approximately 1/32" above the surface of the conveyor 2.

The auxiliary conveyor 5 comprises a chain conveyor 63 (Figure 24) upon which pairs of cradles 64 are pivotally mounted. These cradles are substantially T-shaped and the cradles of each pair are aligned with each other in a direction at right angles to the direction of travel of the chain conveyor 63. Each cradle is provided with a cam follower (not shown) which engages a cam path (not shown) arranged close to the chain conveyor. This cam path has such a shape that the cradles 64 adopt the positions shown in Figure 24 as they are moved by the chain conveyor along the side of the conveyor 2 in the direction of the arrow A. The chain conveyor 63 is mounted on suitable sprocket wheels (not shown), the shaft of one of these sprocket wheels being designated by the reference numeral 65 in Figure 21. The chain conveyor is driven by a chain and sprocket mechanism (not shown) from the same power source as that which drives the conveyor 2 with the result that the speeds of the two conveyors 2 and 63 bear a constant ratio to one another.

Between the cradles of each pair of cradles 64 there is arranged a stationary supporting member 66 the upper surface of which is inclined downwardly with respect to the upper run of the conveyor 2 in the direction of travel of the latter.

The upwardly directed limbs 67 of adjacent pairs of cradles 64 and the member 66 define pockets 68 into which the deflector plates 53–57 deflect the biscuits of the rows 41–45. A vertical stationary wall 69 (which has been omitted from Figure 24 for the sake of clarity) prevents the biscuits from falling off the auxiliary conveyor 5.

In order that the biscuits passing off the edge of the main conveyor 2 shall fall cleanly into the pockets 68, and not become lodged on the upper ends of the limbs 67 of the cradles 64, an escapement mechanism 70 is arranged in the path of travel of each of the rows 41–45 close to that edge of the main conveyor 2 lying adjacent to the auxiliary conveyor 5. Each escapement mechanism 70 (see Figure 22) comprises a substantially semi-circular body 71 through which a shaft 72 passes, the body 71 being secured to the shaft 72 by a grub screw 73. A substantially circular plate 74 is secured to each face of the body 71 and two arms 75a and 75b are pivotally mounted on pins 76 supported at their ends in the two plates 74. Two light coil springs 78, housed in the body 71, urge the arms 75a and 75b against stops 77 mounted between the plates 74. The shafts 72 of the five escapement mechanisms 70 are rotatably mounted in the deflector plate 57 and in one or more of the other deflector plates 53—56. An upwardly extending arm 79 is fixed to each shaft 72 close to the deflector plate 57, the upper end of each arm 79 being pivotally connected to a beam 80. One end of the beam 80 is joined to one end of a coil spring 81, the other end of the latter being anchored to the apparatus frame. One end of a chain 82 is joined to the beam 80 intermediate the ends of the latter. This chain passes round a sprocket wheel 83 rotatably mounted on a vertical shaft 84 secured to the apparatus frame. The other end of the chain 82 is joined to the lower end of a lever 85 (Figure 23) which is pivotally mounted intermediate its ends on a shaft 86 secured to the apparatus frame. The upper end of the lever 85 carries a cam follower 87 which bears against a cam 88. The latter is secured to a shaft 89 which is rotatably mounted in bearings 90 in the apparatus frame and is driven by a sprocket 91 and chain 92 from the same power source as that which drives the conveyors 2 and 5.

When shaft 89 rotates, the cam 88 and the spring 81 cause the beam 80 to reciprocate in the direction of its longitudinal axis with the result that the shafts 72 rotate alternately in either direction through a few degrees. This causes the free end of the arm 75a to move alternately toward and away from the conveyor 2 while the free end of the arm 75b moves alternately away from and toward the conveyor 2.

In Figure 22 the arm 75b is shown in its lowermost position in which it is preventing the biscuit 1a from moving along with the conveyor 2. When the free end of the arm 75b rises it will release the biscuit and allow it to travel along with the conveyor 2 and fall into one of the pockets 68, the movements of the escapement mechanisms and the conveyors 2 and 5 being suitably synchronized with this end in view. If a biscuit is suitably positioned on the conveyor 2, before it reaches an escapement mechanism, so that it will drop cleanly into one of the pockets 68 of the auxiliary conveyor 5, the escapement mechanism will be in such a position that the biscuit will pass under the two arms 75a and 75b without being checked by either arm.

If the free end of either of the arms 75a, 75b moves down on to the top of a biscuit, the latter will be held until the arm rises again but it will not be damaged since the arm will yield against its associated spring 78. In an alternative construction the body 71 and the arms 75a, 75b may be moulded in one piece from resilient material such as rubber with this object of preventing damage to the biscuits.

From the above description it will be appreciated that orderly vertical stacks 6 of biscuits will be produced on the supporting member 66 in the pockets 68, which stacks are moved along the member 66 by the cradles 64 of the conveyor 5 in the direction of the arrow A. The inclination of the supporting member 66 relative to the conveyor 2 preferably is such that the upper biscuit in each of the stacks 6 is at approximately the same distance below the upper run of the conveyor 2.

In order to insure that the biscuits in each stack 6 lie on top of one another in an orderly manner it may be desirable to provide a short guide 93 at the end of each of the deflector plates 53–57 lying adjacent to the conveyor 5. These guides (only one of which is shown in Figures 21 and 24) allow the biscuits to overhang the edge of the conveyor 2 to a considerable degree before they drop into the pockets 68.

Various modifications can, of course, be made to the apparatus described above with reference to Figures 21–24. Thus the number of deflector plates may be less than, or greater than, five and these deflector plates may be arranged to deflect only a proportion of the biscuits on the conveyor 2 on to the auxiliary conveyor 5. Again, the auxiliary conveyor 5 need not be constructed in the manner described above and could, for instance, consist of a band conveyor of the kind illustrated in Figures 4–10.

The apparatus described above with reference to Figures 21 to 24 is particularly suitable where a very large output of biscuits has to be dealt with. The apparatus has the advantages that the biscuits are handled gently and hygienically and are under observation at all times, that the biscuits in the original rows 41 to 45 are blended in the stacks 6 and that any disturbances arising in the apparatus through biscuits becoming displaced from their normal positions are self-clearing.

Although the above description is confined to apparatus for handling biscuits, it will be appreciated that apparatus according to this invention may be used equally well with any other flat articles, for example slabs of chocolate and certain kinds of sweets.

We claim:

1. In a stacking arrangement in combination, main conveyor means forming an upper main conveyor surface for conveying thereon a plurality of rows of articles to be stacked which rows extend in the direction in which they are being conveyed; auxiliary conveyor means forming an upper auxiliary conveyor surface and being arranged alongside of said main conveyor means in such a manner that said auxiliary conveyor surface is below said upper main conveyor surface; and deflector means arranged above said main conveyor surface for deflecting the rows of articles conveyed thereon onto said auxiliary conveyor surface in such a manner as to form a single multiple layer row of articles.

2. The combination defined in claim 1 wherein said auxiliary conveyor means travels in the same direction as and at the same rate at which said main conveyor means travels, and wherein the paths of said conveyor surfaces are inclined relative to each in such a manner that at the point at which each row conveyed on said main conveyor surface is deflected onto said auxiliary conveyor surface, the latter is below the former a distance which is approximately equal to the thickness of each article to be stacked times the number of layers already on said auxiliary conveyor surface.

3. The combination defined in claim 2 wherein said deflector means are so arranged that the rows of articles on said main conveyor surface are deposited onto said auxiliary conveyor surface in such a manner that the articles of each layer are staggered relative to the articles of the contiguous layers.

4. The combination defined in claim 2 wherein said deflector means are so arranged that the rows of articles on said main conveyor surface are deposited onto said auxiliary conveyor surface in such a manner that the articles of each layer are in alignment with the articles of the contiguous layers.

5. The combination defined in claim 4 wherein said auxiliary conveyor means is formed with compartment means adapted to receive individual stocks of superposed articles.

6. The combination defined in claim 5, and means operatively associated with said main conveyor means and arranged in the path of travel of the rows of articles carried on said main conveyor surface for positioning the articles thereon at predetermined intervals before they are deflected onto said auxiliary conveyor surface.

References Cited in the file of this patent
UNITED STATES PATENTS

| | | |
|---|---|---|
| 1,898,393 | Rickers | Feb. 21, 1933 |
| 2,603,341 | Knee | July 15, 1952 |
| 2,612,984 | Alden | Oct. 7, 1952 |
| 2,781,887 | Forster | Feb. 19, 1957 |